United States Patent
Kutz

(10) Patent No.: US 7,828,514 B2
(45) Date of Patent: Nov. 9, 2010

(54) ROTOR FOR AN ENGINE

(75) Inventor: Joachim Kutz, Schwabhausen (DE)

(73) Assignee: MTU Aero Engines GmbH, Munich (DE)

( * ) Notice: Subject to any disclaimer, the term of this patent is extended or adjusted under 35 U.S.C. 154(b) by 805 days.

(21) Appl. No.: 11/661,179

(22) PCT Filed: Aug. 26, 2005

(86) PCT No.: PCT/DE2005/001500

§ 371 (c)(1),
(2), (4) Date: Feb. 26, 2007

(87) PCT Pub. No.: WO2006/024273

PCT Pub. Date: Mar. 9, 2006

(65) Prior Publication Data

US 2007/0258813 A1  Nov. 8, 2007

(30) Foreign Application Priority Data

Sep. 1, 2004  (DE) ...................... 10 2004 042 295

(51) Int. Cl.
*F01D 5/08* (2006.01)

(52) U.S. Cl. ........................... 415/115; 415/1; 415/116; 416/1; 416/95; 416/198 A

(58) Field of Classification Search ...................... 415/1, 415/115–117; 416/1, 95, 96 R, 96 A, 97 R, 416/198 A, 200 A, 201 R
See application file for complete search history.

(56) References Cited

U.S. PATENT DOCUMENTS

| 2,996,280 | A | * | 8/1961 | Wilson, III | ................. 416/97 R |
| 3,632,221 | A | * | 1/1972 | Uehling | ...................... 415/115 |
| 3,897,168 | A | | 7/1975 | Amos | .......................... 415/144 |
| 4,795,307 | A | * | 1/1989 | Liebl | ............................ 415/115 |
| 4,919,590 | A | * | 4/1990 | Stratford et al. | .............. 415/116 |
| 2002/0182059 | A1 | | 12/2002 | Escure et al. | ................ 415/115 |
| 2003/0101730 | A1 | | 6/2003 | Hein et al. | ..................... 60/785 |

FOREIGN PATENT DOCUMENTS

JP  11-125199  5/1999

* cited by examiner

*Primary Examiner*—Christopher Verdier
(74) *Attorney, Agent, or Firm*—Davidson, Davidson & Kappel, LLC

(57) ABSTRACT

A rotor (10) for a power plant, in particular an aero engine or a gas turbine, whereby the rotor (10) includes at least two bonded rotor discs (12, 14). The rotor (10) has an inlet opening (30) for inlet of fluid from around the rotor (10) into a chamber (26, 44) in one or between two adjacent rotor discs (12, 14) and at least one interrupter element (38) with at least one fluid passage (40) is arranged in the chamber (26).

12 Claims, 3 Drawing Sheets

ROTOR FOR AN ENGINE

The present invention relates to a rotor for an engine, in particular a rotor for a compressor of an aircraft engine or a gas turbine.

BACKGROUND

Rotors for compressors of gas turbines or aircraft engines are for the most part constructed in such a way that air is diverted at the compressor of the engine and is conducted preferably with low loss to the inside to a consumer, in particular for cooling. As the cooling air mass flow is conducted, considerable pressure losses occur as early as when the air is diverted from the compressor drum and conducted to the disk hub on which the compressor disks are mounted. Therefore, an air mass flow of the magnitude necessary for generating sufficient cooling of the turbine is not made possible.

As a rule, apertures or bore holes are provided on the outside of the rotor so that air from the compressor drum may reach the disk hub. For example, these apertures are provided on disk vanes or flanges of the disks. A radial mass flow of compressor air from the compressor drum may enter the rotor, in particular between the disks, via these apertures. Flow losses occur since conducting the air via a bore hole into a chamber formed between the disks causes a turbulence or a swirl in the flow. A system of a free vortex and Ekman layers develops after a flow through the aperture. These flow conditions cause a great pressure drop which makes it impossible to reach the required mass flow of (0.7% to 1.5%), for example.

In order to avoid this flow pattern and the resulting pressure losses, devices, which are supposed to conduct the radial flow, are used in some engines. For example, radially directed tubes are used which are also referred to as "giggle tubes." Using these tubes, a rigid vortex which generates only a small pressure drop may be forcibly produced. Although the required flow rate for cooling may be achieved in this way, the approach of the related art has a number of disadvantages. On the one hand, mounting these tubes poses a problem. Moreover, the weight of the rotor is a disadvantage which is increased by these tubes and the mounting device. Finally, these tubes are subject to friction wear, the so-called fretting, and are exposed to vibrations.

SUMMARY OF THE INVENTION

Therefore, it is the object of the present invention to create a rotor in which a sufficient mass flow of air from the drum to the disk hub may be implemented and the further problems of the related art may be eliminated at the same time.

The present invention is based on the finding that the object may be achieved by separating the vortex, which occurs when air is conducted into the inside of the rotor, into multiple sub-vortexes.

The present invention provides a rotor for an engine, in particular an aircraft engine or a gas turbine, the rotor having at least two rotor disks connected to one another. The rotor is characterized in that an inlet aperture is provided for the entry of fluid from the area surrounding the rotor into a chamber in one rotor disk or between two adjacent rotor disks and at least one interrupting element having at least one fluid passage is situated in the chamber.

As defined in the present invention, an area surrounding the rotor is the area outside of a radius on which the outermost connection point between adjacent rotor disks is provided. In particular, this area represents the compressor drum in which the blades of the compressor disks run and which is surrounded by the compressor housing.

By providing an interrupting element which disturbs, i.e., interrupts the air flow, a vortex, which would form during entry through the inlet aperture without an interrupting element, cannot fully develop. The flow is changed by passing through the passage in the interrupting element. Two sub-vortexes occur when one single interrupting element is provided, one vortex forming downstream from the inlet aperture and one vortex forming downstream from the passage. This flow characteristic makes it possible to optimize the pressure drop and thus the air mass flow to the hub and further to the turbine.

In one specific embodiment, the rotor is designed in such a way that at least two adjacent chambers are formed by the at least one interrupting element which are connected to one another via the fluid passage.

Within the scope of this invention, a space is defined as a chamber whose dimension in the axial direction of the rotor is greater over at least part of the height of the space than the dimension of the inlet aperture and the outlet aperture.

This rotor design makes it possible that suitable flow patterns may form in the individual chambers and that overall a flow may be achieved which results in a very low pressure drop and along with it an optimum mass flow for cooling air.

If only one interrupting element is provided, only a low turbulence may develop in the flow in the first chamber due to the radial limitation by the interrupting element. The same is true for the second chamber which faces the hub of the rotor.

The rotor is made up of at least two rotor disks which are rigidly connected to one another via suitable connecting means. The connection may be established via screws or by welding, for example.

The rotor disks are preferably connected to one another in such a way that there is a gap between the individual rotor disks which form the rotor. In one specific embodiment, the at least one interrupting element is provided in this gap between two adjacent rotor disks, thereby forming two chambers in the gap. In contrast to the specific embodiment in which the at least one interrupting element is positioned in the rotor disk itself and thus forms the chambers in the disk, this specific embodiment has the advantage of simpler manufacturing. The disks do not have to be manufactured using a complex hollow casting method or subjected to a complex drilling process.

The interrupting element preferably represents a connecting element. This makes it possible to further enhance the rotor's stability. At least one connecting element is mandatory for producing a disk packet which is jointly supported. This connecting element represents a disk flange, for example. The inlet aperture may be provided in this connecting element. The connecting element lends itself to this since the wall thickness of the connecting elements, such as disk flanges, for example, is as a rule smaller than the wall thickness of the disk. Due to this fact, introducing a bore hole or another aperture into the connecting element is simpler than introducing a bore hole through the disk. The stability of the rotor packet may be further enhanced by designing the interrupting element as an additional connecting element. A passage may also be introduced into this additional connecting element in a simple manner.

Both the inlet aperture and the at least one passage are particularly preferably designed in such a way that they have a length which conducts the flow. This is achieved in particular by introducing the inlet apertures into components having a small wall thickness and thereby providing the required hydraulic conditions for generating at least two sub-vortexes with a low pressure drop.

The inlet aperture and the at least one passage are preferably positioned radially. This alignment ensures that the flow entering the outer chamber, for example, is able to exit again without extreme turbulences. The inlet aperture and the passage are particularly preferably aligned with each other. The outlet aperture of the second, inner chamber is formed by the gap between the adjacent disks at their inner radius. As a rule, the disks are reinforced at the inner radius. A taper of the inner chamber is thereby formed at its outlet via which the air exits from the chamber.

The interrupting element and the connecting element, in which the inlet aperture is provided, are preferably designed in one piece with one of the disks and represent in particular disk flanges or disk wings. This specific embodiment has the advantage that the manufacture of the disk packets may be simplified since a separate process of attaching the connecting element and the interrupting element to both adjacent disks may be omitted. In addition, the one-piece design improves the stability.

The interrupting element is provided in an area in which, due to the inlet aperture, a system of a free vortex and Ekman layers would develop. By interrupting the flow in this area, the flow pattern may be improved overall. A swirl, which is formed in the first chamber, has a certain vortex circumferential velocity which is reduced by passing through the passage. A pressure drop occurring due to an angular flow toward the passage is low compared to a pressure drop which occurs during further development of the vortex.

The rotor according to the present invention is preferably used in the high pressure compressor of the engine.

BRIEF DESCRIPTION OF THE DRAWINGS

The present invention is explained in greater detail in the following with reference to the appended figures.

The approaches and problems of the related art are explained in the following with reference to FIGS. 1 and 2.

DETAILED DESCRIPTION

Figure 1:
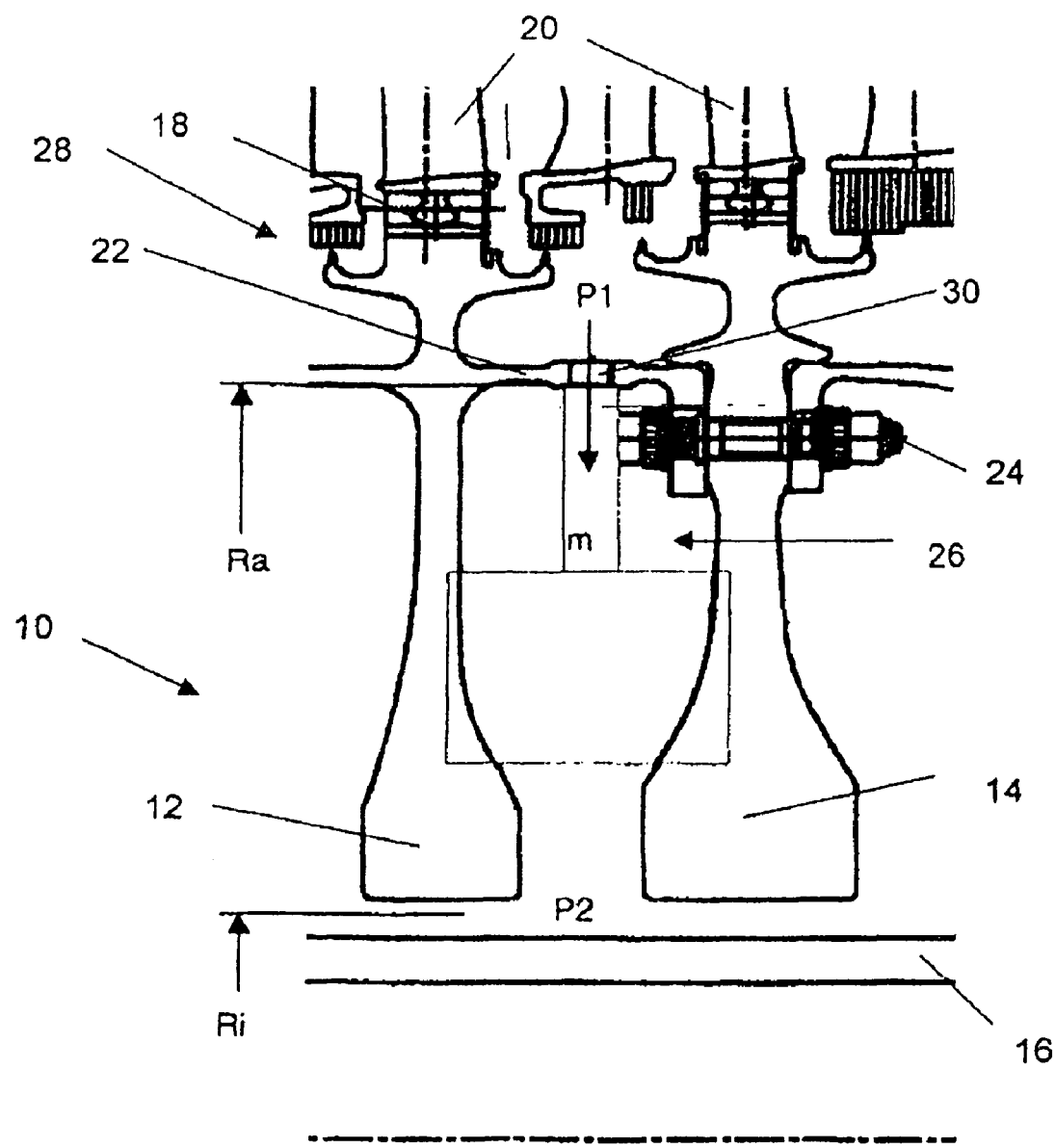
FIG. 1 shows a section of a rotor according to the related art in a schematic sectional view.

FIG. 1 shows a section of a rotor 10. Depicted are two rotor disks 12 and 14 in whose bore hole there is a shaft 16. Disks 12 and 14 have grooves on their outer circumference in which root 18 of a blade 20 is fixed. Blades 20 are compressor blades in the depicted embodiment. In the depicted specific embodiment, rotor disk 12 has disk flanges 22 which extend on a radius Ra in the axial direction from disk 12. These disk flanges 22, also referred to as disk wings, are provided at a distance to the outer circumference of disk 12. This means that the disk flanges are provided on a radius Ra which is smaller than the radius on which the grooves for receiving blade roots 18 are provided. Disk flanges 22 are connected at their free ends to an additional rotor disk 14. The connection is implemented via a screw construction 24 in the depicted embodiment.

A chamber 26 is formed by the sidewalls of disks 12 and 14, shaft 16 and disk flange 22. A bore hole 30 is provided in disk flange 22 as the inlet for air from compressor drum 28 in which blades 20 are situated. The outlet of chamber 26 is formed by the gap between both disks 12 and 14 in the area of shaft 16.

Air, which enters chamber 26 via bore holes 30, which act as inlet apertures, is going to form a system of a free vortex and Ekman layers as schematically indicated in the drawing by the rectangles. The ratio of radius Ra, on which disk flanges 22 are situated, to radius Ri on shaft 16, on which the air is conveyed to the turbine, is relevant for the vortex formation. At given edge pressures P1 in the compressor drum and P2 on shaft 16, the necessary mass flow is, as a rule, not achievable with the ratio Ra/Ri because of the great pressure drop in the vortex system.

Figure 2:
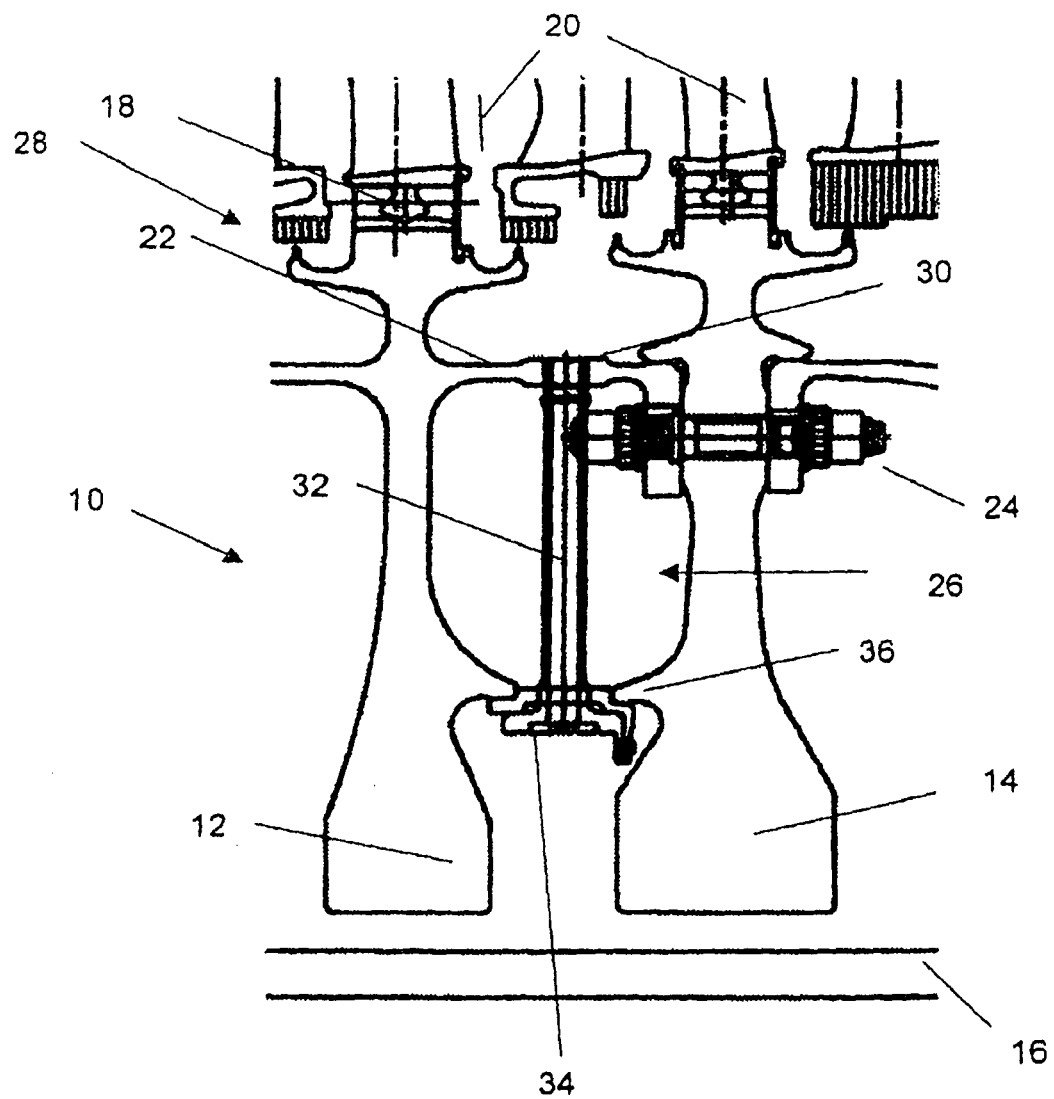
FIG. 2 shows a section of an additional rotor according to the related art in a schematic sectional view.

FIG. 2 shows an alternative to the related art. The construction corresponds essentially to the one of rotor 10 in FIG. 1. The same components are indicated using the same reference numerals as in FIG. 1 and their function is not explained again.

From bore hole 30 on disk flange 22, a tube 32, in the following also referred to as a giggle tube, extends into chamber 26. End 34 of tube 32, situated opposite bore hole 30, is mounted on projections 36 on the sidewalls of rotor disks 12 and 14. From end 34 of tube 32, the air flow from compressor drum 28, which has been conducted through tube 32 and forced into a rigid vortex, may be introduced into the area between rotor disks 12 and 14. The air may be diverted from there and conveyed to a downstream low-pressure turbine (not shown) for cooling.

Figure 3:
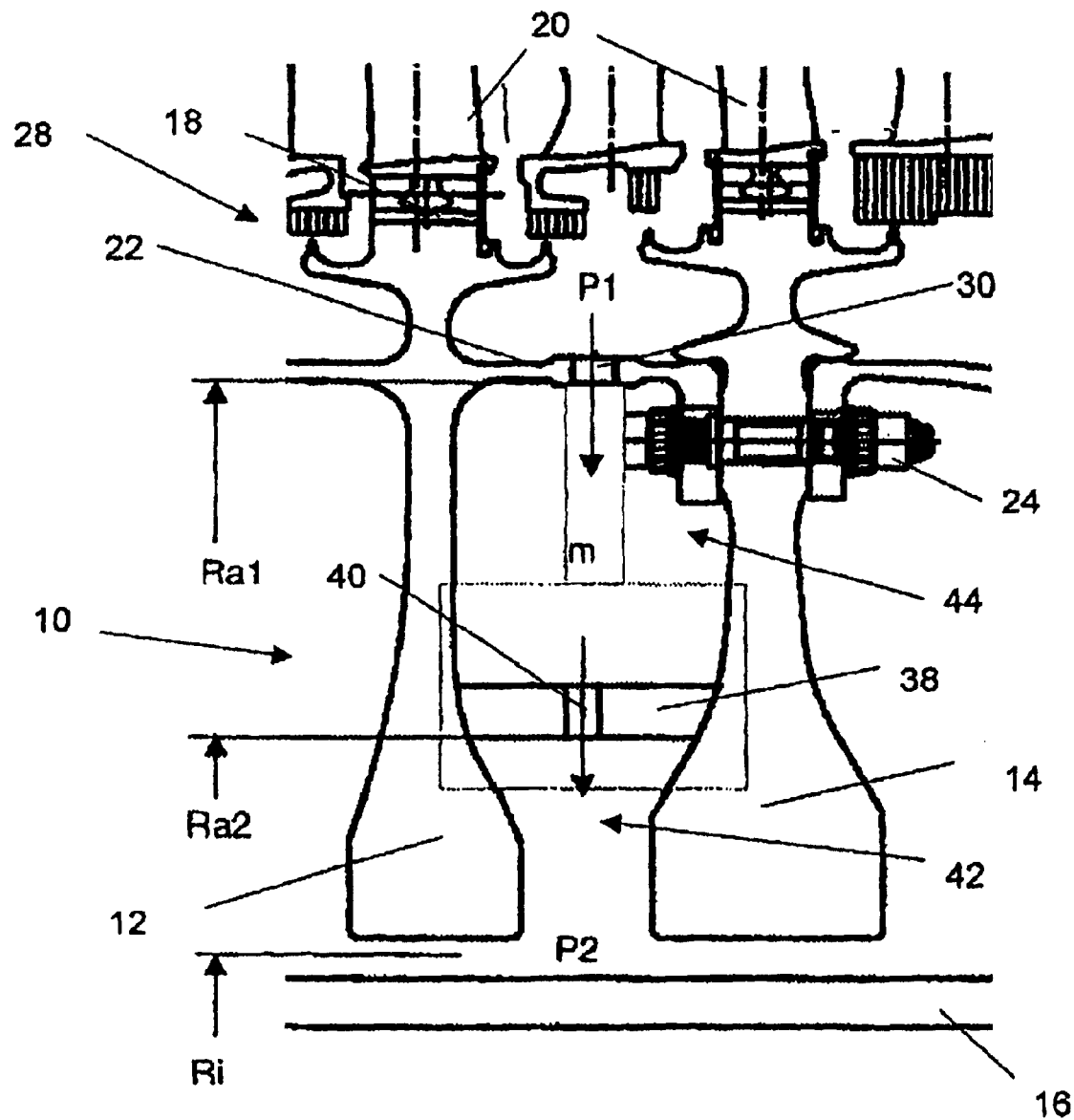
FIG. 3 shows a section of a specific embodiment of a rotor according to the present invention.

FIG. 3 shows a specific embodiment of a rotor according to the present invention. Here also, components which correspond to those in FIGS. 1 and 2 are indicated using the same reference numerals and their construction and function are not explained again.

As is apparent in FIG. 3, an interrupting element 38, which extends axially between rotor disks 12 and 14, is provided in chamber 44 of rotor 10 according to the present invention. In the depicted specific embodiment, interrupting element 38 is mounted on the sidewalls of rotor disks 12 and 14. A passage 40 is provided in interrupting element 38 which may be designed as a ring which is inserted between rotor disks 12 and 14. This passage 40 may be designed as a bore hole or may represent a nozzle.

Due to interrupting element 38, the flow in chamber 26 is interrupted and two radially adjacent chambers 42 and 44 are formed. The flow which enters chamber 44 from compressor drum 28 is subject to a certain turbulence also in this rotor. However, the vortex circumferential velocity is reduced at this point due to interrupting element 38 provided in chamber 26 and passage 40 provided therein. For vortex formation, the ratio of radius Ra1, on which blade flanges 22 are provided, to radius Ra2, on which interrupting element 38 is provided, and to radius Ri on the hub, is relevant in the rotor according to the present invention. The ratio of Ra/Ri given from the related art is thereby reduced. A vortex, which would occur without interrupting element 38, is thus divided into two sub-vortexes, thereby reducing the pressure drop.

The present invention is not limited to the depicted specific embodiment. For example, it is within the scope of the present invention to provide more than one interrupting element in chamber 26. The difference between radius Ra1 and Ra2 may be selected according to the requirements and may be smaller than indicated in FIG. 3. In this case, the interrupting element would be situated displaced in the direction of the disk wing compared to the position shown in FIG. 3.

The interrupting element is provided over the entire circumference of the rotor. A suitable number of fluid passages is provided over this circumference, in particular corresponding to the number of inlet apertures in the disk flange.

What is claimed is:

1. A rotor for an engine comprising:
    at least two rotor disks connected to one another by an axially extending connecting element, the axially extending connecting element being located at a radius Ra1 and having at least one inlet aperture for entry of fluid from an area surrounding the rotor,
    a shaft located in a bore hole of the rotor disks, the shaft and the rotor disks forming a gap at a radius Ri;
    at least one blade attached at a blade root to one of the rotor disks at a radius greater than the radius Ra1; and
    at least one axially extending interrupting element having at least one radially extending fluid passage being situated at a radius Ra2; the connecting element, the at least two rotor disks and the interrupting element defining a first chamber, and the interrupting element, the at least two rotor disks and the shaft defining a second chamber radially adjacent the first chamber, fluid flowing into the first chamber through the at least one inlet aperture and exiting solely through the at least one radially extending fluid passage.

2. The rotor as recited in claim 1 wherein the at least one interrupting element is a connecting element for connecting the two adjacent rotor disks.

3. The rotor as recited in claim 1 wherein the inlet aperture and the fluid passage have a length guiding flow of the fluid.

4. The rotor as recited in claim 1 wherein the inlet aperture and the fluid passage are aligned radially.

5. The rotor as recited in claim 1 wherein the inlet aperture and the fluid passage are aligned with each other.

6. The rotor as recited in claim 1 wherein the connecting element and the interrupting element are designed in one piece with one of the disks.

7. The rotor as recited in claim 1 wherein the interrupting element is provided in an area where a free vortex and Ekman layers are capable of developing due to the inlet aperture.

8. A high-pressure compressor of an engine comprising the rotor as recited in claim 1.

9. An aircraft engine comprising the rotor as recited in claim 1.

10. A gas turbine comprising the rotor as recited in claim 1.

11. The rotor as recited in claim 1 wherein the rotor disks have an axially thicker portion nearer the shaft, the interrupting element being connected at the axially thicker portion.

12. The rotor as recited in claim 1 wherein the ratio Ra1 to Ra2 is selected to permit a first sub-vortex to form in the first chamber and a second sub-vortex to form in the second chamber.

* * * * *